UNITED STATES PATENT OFFICE 2,441,198

TALL OIL TREATMENT

Vigen K. Babayan, Teaneck, N. J., assignor to Ridbo Laboratories, Inc., Paterson, N. J., a corporation of New Jersey No Drawing. Application June 18, 1945, Serial No. 600,235

1 Claim. (Cl. 260—97.5)

This invention relates to treatment of tall oil and is particularly concerned with an improved treatment by which the valuable fatty acid and rosin constituents of tall oil can be substantially completely separated from each other and from other constituents present in the crude material.

As is known, tall oil is a waste or by-product of the process or manufacturing paper. Crude tall oil is composed principally of rosin acids and fatty acids, the latter having characteristics which generally resemble those of the fatty acids of semi-drying fatty oils. The crude tall oil also contains minor amounts of various impurities, color bodies, sterols, etc. The crude material constitutes a mass manifesting a marked sludging tendency, the mass being of very dark color and characterized by a particularly obnoxious odor.

The rosin and fatty acid constituents taken together constitute about 80% to about 90% of the total crude tall oil and these constituents are valuable commercial products capable of many uses provided of course that they can be separated in a relatively pure state. Each of these two major constituents comprises about one-half of the material, excluding impurities, sterols, etc. Many attempts have been made to purify, decolorize, deodorize and even to separate the major constituents of tall oil and, although some degree of purification and separation has already been achieved, all of the prior processes have been subject to one or more disadvantages, including insufficient decolorization or deodorization, insufficient degree of separation of the fatty acid and rosin constituents, excessive commercial cost of the treatment, etc.

The primary object of the present invention is to provide a treatment by which the rosin and fatty acid constituents can be separated from crude tall oil, i. e., separated not only from the impurities, color bodies, etc., but also separated from each other so as to yield two substantially pure constituents, one comprising the fatty acid component and the other the rosin component.

According to the invention this is achieved by a process which is very simple and inexpensive and readily adaptable to commercial operation. In a typical treatment according to the invention, the tall oil is heated for a period of a couple of hours at a temperature of 300° C. in the presence of phosphorus pentoxide. After this treatment the treated tall oil is subjected to distillation, desirably under high vacuum, to separate the distillable portion from the non-distillable residue, the latter containing substantially all of the impurities, color bodies, sterols, etc., some of which have been converted to a substantially non-distillable state because of the previous heat treatment in the presence of the phosphorus pentoxide. The residue may also contain more or less polymers formed as a result of the preliminary heat treatment.

The preliminary heat treatment not only makes possible securing a purified and substantially decolorized and deodorized distillate, but in addition the preliminary heat treatment also extensively decarboxylates the rosin acids present, thereby converting a large proportion of the rosin acids to rosin hydrocarbons.

Another important phase of the process of the invention is the distillation under conditions in which the distillate vapor is subjected to temperatures above about 250° C., preferably as they leave the distilling vessel, before condensation of the vapors. This may be accomplished by heating the off-take conduit which is extended from the still to the condenser. This treatment is effective to insure substantially complete decarboxylation of all rosin acids and thereby yield a distillate essentially consisting of fatty acids and rosin hydrocarbons, the distillate being substantially free of impurities and color bodies and also substantially free of the characteristic tall oil odor.

Because of the elimination of impurities, sterols, color bodies, etc. and also because of the substantially complete conversion of the rosin acids to rosin hydrocarbons, the two remaining constituents of the distillate are readily subject to any one of a number of additional treatments acting selectively on one constituent or the other to effect separation as between the fatty and rosin components.

Preferably, according to the invention, the treatment of the total distillate is of such a character as to effect a reaction with the carboxyl group of the fatty acids present, as a result of which the physical and/or chemical constituents of the fatty acid constituent are substantially altered. The treatment selected, moreover, should be such that the fatty acid derivative is capable of ready separation from the rosin hydrocarbon constituent.

Such a separation may be achieved by any one of the following methods, among others.

Assuming first that tall oil has been treated as above described with phosphorus pentoxide or one of the other agents contemplated and that the treated material has been distilled so as to yield a distillate consisting essentially of fatty acid and rosin hydrocarbons, these two components may then be separated by subjecting the distillate to treatment with an aqueous solution of an alkali such for example as sodium hydroxide under conditions effecting saponification of the fatty acid present. The rosin hydrocarbons may then be separated by extraction with a solvent and the aqueous portion containing the soap may be split, as by acidulating with an acid such as sulfuric or hydrochloric acid, in order to recover the fatty acid in substantially pure state. On the other hand the rosin hydrocarbon solution may be subjected to distillation to eliminate the solvent leaving behind the substantially pure rosin hydrocarbon.

An alternative method for separation is to saponify the fatty acid present in the fatty acid-rosin hydrocarbon mixture by the employment of solid alkali, and thereafter subject the mixture to steam and vacuum distillation. The hydrocarbon component being volatile will distill over with the steam, leaving the fatty acid soap behind. If desired the soap can again be split, for example in the manner described above, although the fatty acid soap may also be used as such.

Another method of separation which may be employed is a carefully controlled high vacuum fractional distillation applied to the mixture after conversion of the fatty acids to a derivative form having a boiling point farther removed from that of the rosin hydorcarbons present than is the case with the fatty acids in their original form. Such fractional distillation, however, may even be applied directly to the original mixture, provided especially accurate distillation conditions are observed.

As an example of separation by fractional distillation, the fatty acid-rosin hydrocarbon mixture is heated at a temperature and under conditions appropriate for esterification, in the presence of enough glycerine or other alcohol to esterify the fatty acid present, and thereby appreciably raise the boiling point of the fatty constituent. This may be done either with or without a catalyst, while passing steam or an inert gas through the mixture. Precautions should be taken not to lose any appreciable amount of the fatty acid or the alcohol. In this way the fatty acid is converted to the corresponding ester and after esterification the rosin hydrocarbon may readily be distilled over to thereby effect separation of the hydrocarbon from the ester.

In all methods of separation described above, the thoroughgoing decarboxylation of rosin present makes possible deriving the two major constituents in substantially pure form.

With respect to the preliminary heat treatment with phosphorus pentoxide as described above, it is mentioned that several variations may be introduced, as follows:

In the first place I have found that, in addition to phosphorus pentoxide, ortho-phosphoric acid may be employed as the decarboxylation promoting and decolorizing agent. Under severe reaction conditions some of the other phosphorus compounds may be used, for instance, phosphorus pentasulfide.

Any of these agents may be employed in quantities ranging from about 0.5% to about 5%, although ordinarily from 1% to 3% is preferred. Upwards of about 3 or 4% tends to excessively increase the quantity of polymers formed during the preliminary heat treatment, and thereby reduce the ultimate yield of the fatty and rosin constituents. Moreover, from the standpoint of decarboxylation and decolorization, not any appreciable improvement is observable by increase of the quantity of treating agent above 3 or 4%.

The temperature of pretreatment may also be varied over a range extending from about 250° C. to about 350° C., although the most effective and practicable range lies between about 275° C. and 325° C.

A factor of importance in the preliminary heat treatment is that moisture should be eliminated so far as is possible and for this reason it is prefered to first heat the tall oil to volatilize any moisture before adding the treating agent. Moreover, for this same reason, it is desirable to employ an anhydride, such as phosphorus pentoxide. However, in the event of employment of ortho-phosphoric acid, the temperature of the pretreatment, particularly toward the upper end of the range indicated apparently converts at least a portion of the ortho-phsphoric acid employed to the anhydride form.

It should also be mentioned that in the preferred practice of the invention the conditions maintained during the preliminary heat treatment are preferably such as to effect the maximum possible decarboxylation of rosin acids. This is also true of the distillation stage, especially with respect to the distillate vapor temperature, since with the optimum conditions for decarboxylation maintained at both of these stages of the treatment, a virtually complete conversion of the rosin acids to rosin hydrocarbons is achieved. Although it is preferred to maintain a zone of distillate vapor temperature above about 250° C., nevertheless this temperature is not as important in the early stages of distillation as it is during the later stages, since toward the start of distillation rosin hydrocarbons constitute the major portion of the distillate vapor. Toward the end of the distillation any remaining rosin acids tend to distill along with the fatty acids and it is at this time that the hgher temperatures are of importance to insure decarboxylation of the remaining rosin acids.

Care should be taken during the distillation not to heat the distillate vapor to too high a temperature (preferably not above about 310° C.), this being of importance to avoid fire hazard, to avoid imparting a burnt odor to the product, and to avoid any decarboxylation of fatty acids present, which would, of course, decrease the ultimate yield of fatty acids. A blanket of $CO_2$ or other inert gas in the still will further decrease fire hazard.

By appropriately controlling conditions, particularly the decarboxylation conditions established in the preliminary heat treatment and the vapor distillate temperature during the distillation, a distillate is secured containing little if any remaining rosin acids, usually less than 4%. In many cases even less than 1% rosin acids remain, and this is preferred. It is pointed out that even when maintaining optimum decarboxylation conditions in the preliminary heat treatment, if an effective decarboxylation temperature is not maintained in the distillate vapor, appreciable quantities of rosin acids will be found in the distillate, usually upwards of 8 or 10%. This is objectionable, especially from the standpoint of the fatty acid product ultimately secured by the process, since the rosin acids at least in large part remain with the fatty acid constituent and are capable of separation therefrom only by painstaking laboratory methods.

EXAMPLES

In the examples herebelow, there is first illustrated the effect of the heat treatment with ortho-phosphoric acid and with phosphorus pentoxide and the effect of the high temperature distillation; and thereafter examples are given illustrating methods for separating the rosin and fatty acid constituents of the previously treated and distilled tall oil.

In considering the analytical data given in the examples it should be kept in mind that, by common analytical laboratory methods, it is difficult to secure exact analysis with reference to the percentage of rosin acids present in admixture with fatty acids, in cases where the total quantity of rosin acids is less than about 3 or 4%. By the commonly employed analytical methods, where the content of rosin acids in the admixture is less than about 3 or 4%, the analysis indicates a higher rosin acid content than is actually present. The discrepancy can be established by painstaking analytical technique which need not be considered herein. In considering the examples, therefore, it should be kept in mind that the figures representing percentage of rosin acids, as given, are higher than the actual rosin acid content of the products secured according to the invention, and in some cases the actual percentage of rosin acids in the products is virtually nil.

EXAMPLE 1

As illustrative of the technique, this example is described in full, others being given here below merely in tabular form for the sake of brevity.

In the present example, 3,000 grams of crude tall oil were heated to 200° C., and when moisture had been volatilized, 1½% by weight of an 85% ortho-phosphoric acid solution was slowly added, under mild agitation. After all of the acid had been added, the temperature was thereafter rapidly raised to 300° C. and was kept there for 1 hour. During this treatment a mixture of gas, water and of a light yellow oil having a strong foul odor distilled over. The product remaining in the reaction vessel was a dark green viscous oil having an acid number of 87 and a Hübl iodine number of 98.

The tall oil, treated as above, was then transferred to a distilling flask and distilled under vacuum. The distillation was effected in a manner maintaining a zone of relatively high or superheated vapor temperature, somewhat above 250° C. The distillate which came over through this superheated zone had a boiling range between 120° C. and 230° C. at about 2 mm. Hg. The temperature in the distilling flask was about 290-300° C. during the course of the distillation.

The distillate was a light yellow oil having an acid number of 85 and a Hübl iodine number of 108, and contained 39.4% fatty acids and 3.9% rosin acids (according to the analytical method employed). If the positive error was corrected, the rosin acid content would lie appreciably below 3%. The balance of the distillate consisted of rosin hydrocarbons.

From the above it will be seen that the foregoing treatment secured a product consisting essentially of fatty acids and rosin hydrocarbons. The fatty acid and rosin hydrocarbon constituents of this product were separated according to an example given hereinafter, following presentation of a group of examples generally similar to Example 1 illustrating some variations in the treatment with the acid and in the distillation.

EXAMPLES 2–6

The important data with reference to these examples is given in the table herebelow, which table also includes the corresponding data for Example 1, for purposes of comparison. It may be mentioned that in all of these examples a zone of high vapor temperature was maintained during distillation (between 250° and 310° C.).

*Table*

| Ex. No. | Per Cent Agent | Time (hrs.) at 300° C. | Boiling Range of Distillate | Rosin Acids (per cent) Less Than | Fatty Acids, Per Cent |
|---|---|---|---|---|---|
| 1 | 1.5% $H_3PO_4$ | 1 | 120–230° C. at 2 mm. Hg. | 3.9 | 39.4 |
| 2 | 2% $H_3PO_4$ | 2 | 140–225° C. at 3 mm. Hg. | 3.0 | 36.2 |
| 3 | do | 2.75 | 150–230° C. at 10 mm. Hg. | 3.4 | 43.8 |
| 4 | 2% $P_2O_5$ | 3 | 180–220° C. at 2 mm. Hg. | 1.0 | 41.5 |
| 5 | do | 1 | 140–210° C. at 4 mm. Hg. | 3.5 | 40.4 |
| 6 | 1.5% $P_2O_5$ | 2 | 100–220° C. at 4 mm. Hg. | 2.2 | 39.5 |

EXAMPLE A

This example illustrates one method of separating the constituents of tall oil treated in accordance with the method illustrated by Examples 1 to 6 above.

In Example A a portion of the product of Example 1 above was heated for 4 hours at between 220 and 230° C. with 10% of glycerine and 0.5% of calcium stearate. This yielded an esterified product having an acid number of 1.4 and the esterified product was then subjected to distillation. The cut was taken at 200° C. and at 2 mm. Hg and this readily yielded a yellow distillate comprising the rosin hydrocarbon fraction which on analysis was shown to have an acid number of 1.7 and a Hübl iodine number of 111. The residue comprised the ester which could be used without further treatment. However, the distillation was continued at a temperature above 200° C., and still at 2 mm. Hg, yielding an orange colored oil, comprising the ester in a purer form. The oil had a Hübl iodine number of 85 and an acid number of 1.0 and a saponification number of 159.

From the above it will be seen that virtually complete separation of the rosin and fatty acid constituents of tall oil was effected.

EXAMPLE B

A portion of the product of Example 4 above was subjected to treatment to separate the rosin and fatty acid constituents, the method employed in this example being saponification, rather than esterification. For this purpose the material was first saponified with an excess of sodium hydroxide in aqueous solution. When saponification was complete the solution was diluted with sufficient water to permit extraction with ethyl ether. Extraction was performed several times and each extract was washed free of soap with distilled water and then dried over anhydrous sodium sulfate. The extracts were filtered and finally the solvent was distilled therefrom, yielding a clear yellow oil product having a Hübl iodine number of 96, comprising the rosin hydrocarbon constituent.

The soap solution remaining after the ether extractions was then acidulated, and the split fatty acids were then extracted with ether. The extracts were washed until free of the acidulating mineral acids, and were dried over anhydrous sodium sulfate. Finally, the ether was distilled from the extracts yielding a clear light amber liquid having an acid number of 198 and a Hübl iodine number of 89.

The total yield of rosin hydrocarbons and fatty acids secured in this way was 95.8% of the material taken for separation, the rosin hydrocarbons representing 57.8% and the fatty acids 38%.

I claim:

A process for separating constituents of tall oil, which process comprises preliminarily heating the tall oil with from .5% to 5% of a treating agent selected from the class consisting of phosphorus pentoxide and ortho-phosphoric acid at a temperature between about 250° C. and 350° C., distilling off the distillable constituents and during distillation maintaining a zone of distillate vapor temperature of from about 250° C. to about 310° C., the preliminary heating and distillation being carried on for a time and under conditions effecting substantially complete decarboxylation of the rosin present in the tall oil taken for treatment to thereby yield a distillate essentially consisting of fatty acids and rosin hydrocarbons, and separating the fatty and rosin constituents of said distillate.

VIGEN K. BABAYAN.

REFERENCES CITED

The following references are of record in the file of this patent:

UNITED STATES PATENTS

| Number | Name | Date |
| --- | --- | --- |
| 1,131,939 | Melamid | Mar. 16, 1915 |
| 1,133,994 | Melamid | Mar. 30, 1915 |
| 2,280,247 | McKee | Apr. 21, 1942 |
| 2,298,270 | Auer | Oct. 13, 1942 |
| 2,396,471 | Osterhof | Mar. 12, 1946 |